US007854086B2

(12) United States Patent
Huynh

(10) Patent No.: US 7,854,086 B2
(45) Date of Patent: Dec. 21, 2010

(54) FISHING ROD WITH ERGONOMIC HANDLE

(76) Inventor: Chi Huynh, 548 W. Bonita Ave., San Dimas, CA (US) 91773

( * ) Notice: Subject to any disclaimer, the term of this patent is extended or adjusted under 35 U.S.C. 154(b) by 343 days.

(21) Appl. No.: 12/200,542

(22) Filed: Aug. 28, 2008

(65) Prior Publication Data

US 2010/0050496 A1 Mar. 4, 2010

(51) Int. Cl.
*A01K 87/00* (2006.01)

(52) U.S. Cl. ....................................... 43/23; 43/18.1 R

(58) Field of Classification Search .................... 43/23, 43/18.1 R, 22
See application file for complete search history.

(56) References Cited

U.S. PATENT DOCUMENTS

| | | | | |
|---|---|---|---|---|
| 980,942 | A * | 1/1911 | Hanson | 43/23 |
| 2,149,837 | A * | 3/1939 | Browne | 43/23 |
| 3,196,572 | A * | 7/1965 | Steinle | 43/22 |
| 3,222,811 | A * | 12/1965 | Henson | 43/18.1 R |
| 3,296,732 | A * | 1/1967 | Magnus | 43/23 |
| 3,372,510 | A | 3/1968 | Arsenault | |
| 4,014,129 | A | 3/1977 | Capra | |
| 4,651,461 | A | 3/1987 | Williams | |
| 4,654,996 | A * | 4/1987 | Gieselman | 43/23 |
| 4,845,879 | A * | 7/1989 | Urso | 43/18.1 R |
| 4,876,980 | A | 10/1989 | Bell, III | |
| 5,127,182 | A | 7/1992 | Hutchings et al. | |
| 5,231,782 | A * | 8/1993 | Testa | 43/18.1 R |
| 5,509,228 | A | 4/1996 | Wright | |
| 5,992,079 | A | 11/1999 | Michels et al. | |
| 6,065,204 | A | 5/2000 | Paddock | |
| 6,067,741 | A | 5/2000 | Eaton | |
| D451,578 | S | 12/2001 | Champagne | |
| 6,347,477 | B1 * | 2/2002 | Hopper | 43/20 |
| 6,931,781 | B2 | 8/2005 | Markley et al. | |
| 7,454,862 | B2 * | 11/2008 | Markley et al. | 43/18.1 R |
| 2005/0268523 | A1 * | 12/2005 | Markley et al. | 43/18.1 R |
| 2008/0229648 | A1 * | 9/2008 | Evensen | 43/23 |

* cited by examiner

*Primary Examiner*—Christopher P Ellis
(74) *Attorney, Agent, or Firm*—Biotech Beach Law Group PC

(57) ABSTRACT

The present invention provides a fishing rod with ergonomic handle. The disclosed fishing rod places the angler's wrist in a more ergonomically correct position while waiting for a fish to strike. To accomplish this the fishing rod includes a flexible rod including a plurality of ferrules extending downward; a handle including a primary handle substantially parallel to and vertically above the flexible rod and a secondary handle extending upwards from the primary handle. The primary handle also includes a reel seat for downward attachment of a fishing reel. A transition structure is joined at one end to the flexible rod and at the opposing end to the upper portion of the secondary handle.

7 Claims, 5 Drawing Sheets

20
26
12
38
34
32
24

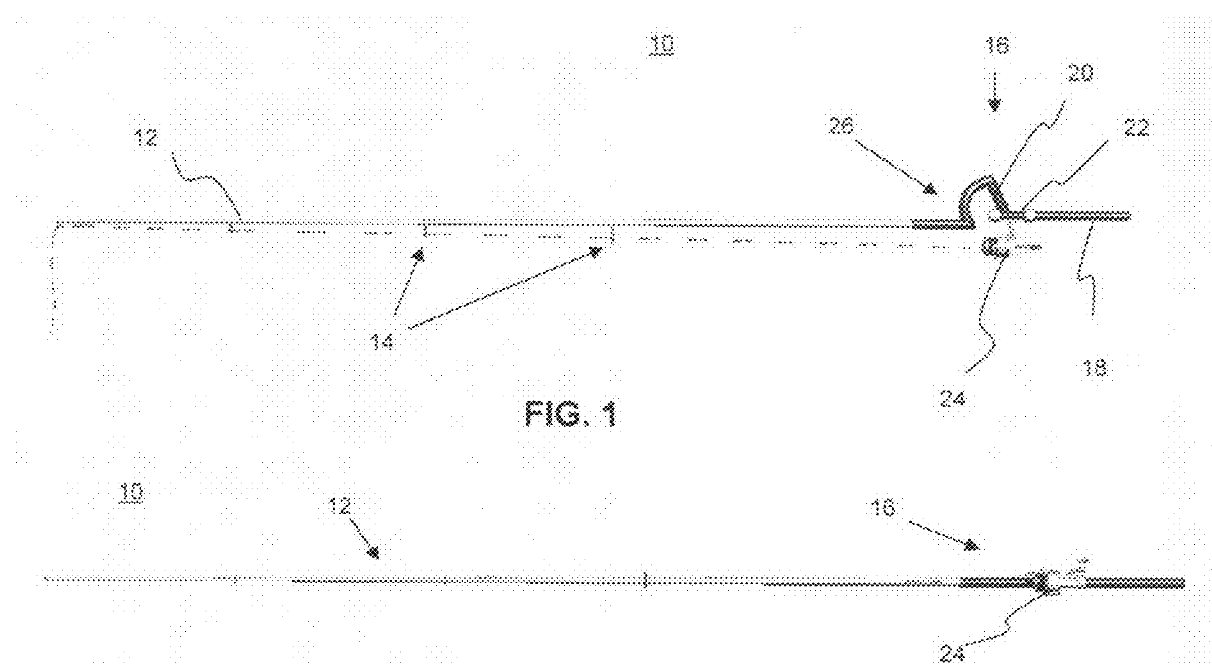
FIG. 1
FIG. 2A
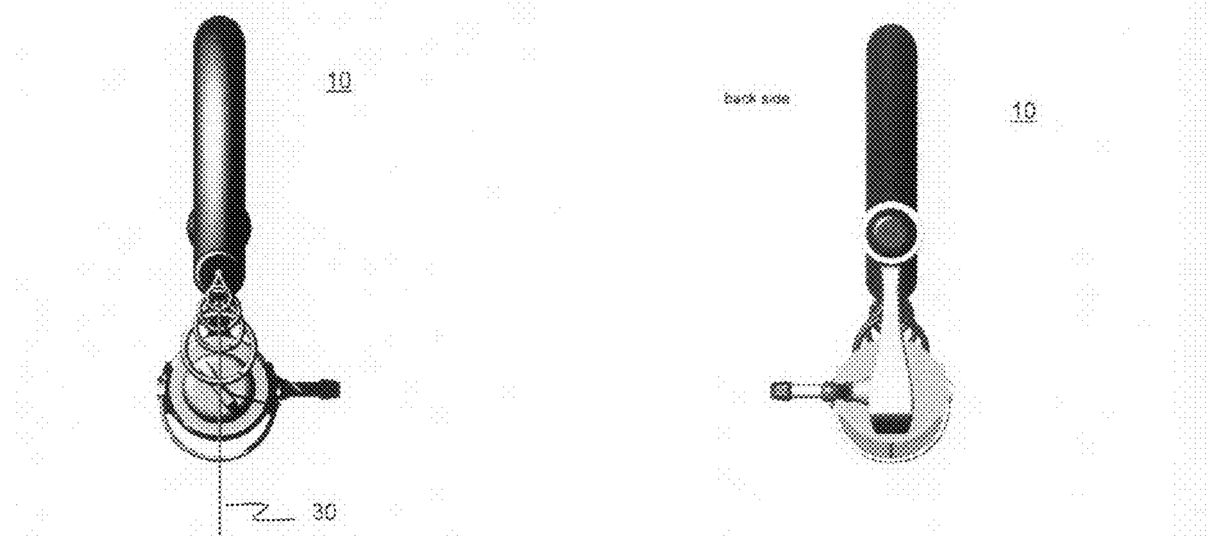
FIG. 2B
FIG. 2C

FISHING ROD WITH ERGONOMIC HANDLE

TECHNICAL FIELD OF THE INVENTION

The present invention relates generally to fishing apparatuses and more specifically to an improved fishing rod with ergonomic handle.

BACKGROUND OF THE INVENTION

The popularity of fishing has lead to the development of a variety of improvements in fishing reels; however, fishing rods remain largely unchanged. Conventional fishing rods include an elongated body having at the proximal end, a handle. Typically the reel is attached towards the distal region of the handle.

Many anglers can attest that fishing often occurs over long periods of time. Thus, in many instances the angler must continuously hold the fishing rod outward while waiting for a fish to strike. Since conventional fishing rods are essentially elongated poles, the force transferred to the handle increases as the fishing rod length increases. This is due to the force of gravity and the physics of torque. Further, since the conventional fishing rod is linear, the angler typically holds the fishing rod with a severely bent or rotated wrist, which can lead to wrist strain and injury. Although a variety of rod configurations have been proposed to address potential wrist injury while fishing, there remains a need for improvement.

U.S. Pat. No. 3,372,510 (the '510 patent) provides a fishing rod with handle device for the manipulation of the fishing rod while maintaining the forearm, wrist and hand in substantial parallelism with the axis of the rod. Specifically, the '510 patent provides a handle device wherein a handgrip projects radially upward from the forward portion of the handle, and a support means projects upward from the rear portion of the handle to saddle the arm. Two configurations are provided. In the first configuration the reel is positioned behind the handgrip. In this configuration the downward force from gravitational pull on the reel is increased at the handgrip due to torque. Further, since the reel extends significantly beneath the ferrules, the fishing line is in constant contact with the most proximal ferrule, which may decrease the performance of the reel or fishing line. The second configuration provides the rod extending horizontally from the top of the handgrip, and the reel positioned forward of the handgrip. Like the first configuration, the reel is positioned away from the handgrip, which increases wrist strain due to the gravitational pull on the reel and transfer of energy by torque. In addition, by extending the rod horizontally from the top of the handgrip, the entire rod will severely rotate once a fish strikes, which can cause injury to the angler's wrist. If the angler's wrist is not initially injured, injury may still occur while reeling in the fish. Specifically, the rod must be counter-rotated while reeling, which strains the wrist.

U.S. Pat. No. 5,992,079 (the '079 patent) provides a wrist-saver fishing rod handle and system. The handle is mounted to the rod. The configuration can be summarized as having a mounting portion and two handles. The first handle is angled downwards and the second handle extends generally parallel to the rod. Thus the rod is vertically above the two handles. The reel is attached to the downwardly angled first handle. However, the device in the '079 patent provides two deficiencies. First, the placement of the reel along a downwardly sloping handle requires a special reel because the reel must be adjusted to accommodate for its angled placement. Therefore the '079 patent is not applicable to most commercially available reels. Second, the configuration risks wrist injury because the rod extends horizontally from the top of the handle. If a fish strikes the entire rod will severely rotate which can cause injury to the angler's wrist. Further, if the angler is not injured on the first strike, the angler must still counter-rotate the rod while reeling in the fish placing additional strain on the wrist. Thus, there remains a need for improved ergonomic fishing rods that reduce injury to the angler's wrist.

SUMMARY OF THE INVENTION

The present invention addresses deficiencies in current fishing rod configurations and provides related benefits. The present invention places the angler's wrist in a more ergonomically correct position while waiting for a fish to strike. To accomplish this, the fishing rod with ergonomic handle includes a flexible rod including a plurality of ferrules extending downward; a handle including a primary handle substantially parallel to and vertically above the flexible rod and a secondary handle extending upwards from the primary handle. The primary handle also includes a reel seat for downward attachment of a fishing reel. A transition structure is joined at one end to the flexible rod and at the opposing end to the upper portion of the secondary handle. In some embodiments, the outside angle between the primary handle and the secondary handle is greater than 90 degrees and less than 180 degrees. In some embodiments the secondary handle contacts the primary handle at the reel seat, which results in the placement of a reel directly beneath the secondary handle. In some embodiments the transition structure may be arced or bent and may be flexible.

BRIEF DESCRIPTION OF THE DRAWINGS

FIG. 1 depicts a side plan view of a fishing rod 10 according to the present invention including a flexible rod 12 having a plurality of ferrules 14 extending downward; a handle 16 including a primary handle 18, a secondary handle 20, and a reel seat 22 for attachment of a reel 24; and a transition structure 26 for joining the flexible rod 12 to the top portion of the second handle 20.

FIG. 2A is a bottom plan view of the fishing rod 10 demonstrating the reel 24 is positioned below the handle 16. FIGS. 2B and 2C depict front and back plan views of fishing rods 10 according to the present invention.

DETAILED DESCRIPTION OF THE INVENTION

Figure 2D:
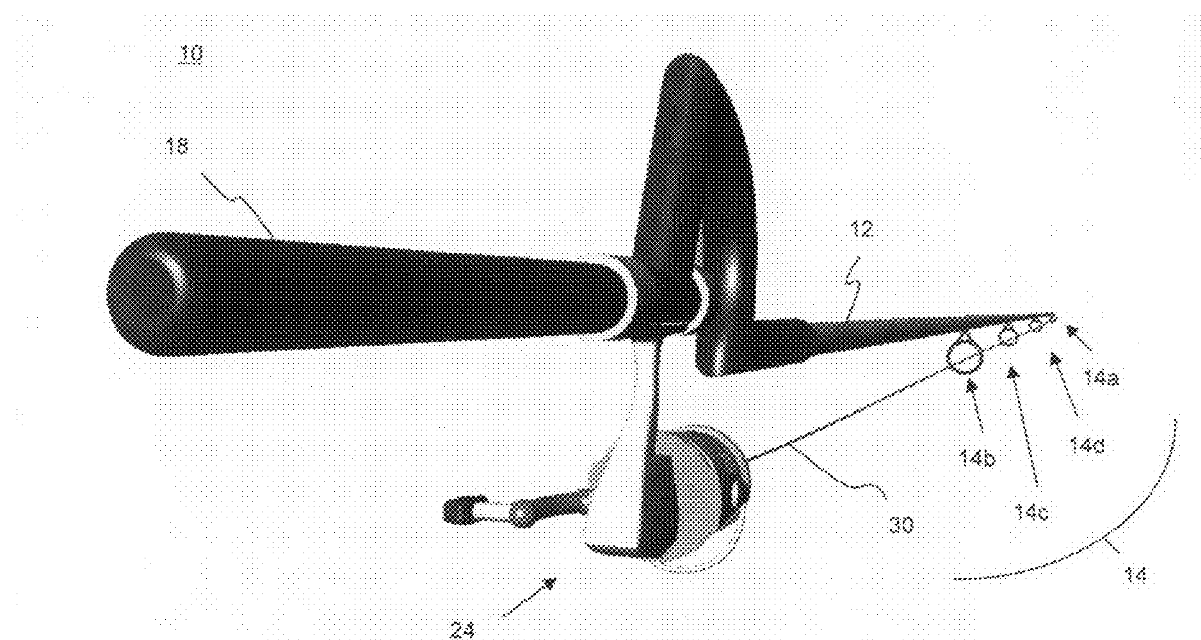
FIG. 2D is a perspective view of a fishing rod 10 demonstrating in part the primary handle 18 is positioned vertically above the flexible rod 12, which may provide improved alignment of the reel 24 with the plurality of ferrules 14.

The present invention addresses deficiencies in commercially available fishing rods and provides related benefits. It is an object of the invention to provide an improved fishing rod for use with commercially available reels. It is another object of the present invention to provide a fishing rod with an ergonomic handle that permits the angler to hold the rod over time with increased comfort.

Referring to FIGS. 1-4, the present invention provides a fishing rod 10 including a flexible rod 12 including a plurality of ferrules 14 extending downward; a handle 16 including a primary handle 18 substantially parallel to and vertically above the flexible rod 12 and a secondary handle 20 extending upwards from the primary handle 18. Now referring to FIG. 1, positioned at the distal region of the primary handle 18 is a reel seat 22 for downward attachment of a fishing reel 24. A transition structure 26 joins the flexible rod 12 and the upper portion of the secondary handle 20. FIG. 2A provides a bottom plan view of the fishing rod 10 including the flexible rod 12 and handle 16. Beneath the handle 16 extends the optional reel 24. FIG. 2B is a front elevational view of the fishing rod 10 also showing the optional fishing line 30. FIG. 2C is a rear elevational view of the fishing rod 10. The flexible rod 12, handle 16 and transition structure 26 may be formed together as a single unit or may be formed separately then joined such as through the use of adhesives, fiberglass and the like.

The average angler will easily adapt to the improved fishing rod 10. Casting is similar to conventional casting methods using spinning reels. The angler holds the primary handle 18, opens the bail 32 of the reel 24 and holds the fishing line 30 against the rod 10 with a finger. The line 30 is cast by flipping the rod 10 forward and releasing the line 30. While the angler waits for a fish to strike, the angler may choose to grasp the secondary handle 20, which places the wrist in a more naturally aligned configuration. Further, the angler may find that by positioning the secondary handle 20 directly above the reel 24, the fishing rod 10 is easier to handle since forces transferred by torque are reduced. Once a fish strikes, the user may either release the secondary handle 20 and grasp the primary handle 18 while reeling in the fish, or may continue to grasp the secondary handle 20 while reeling in the fish. The second option may provide more leverage. The fishing rod 10 provides for a more comfortable fishing trip and may reduce the chance of injury to the angler's wrist.

Referring back to FIG. 1, the flexible rod 12 is a long, straight pole capable of bending or flexing. The flexible rod 12 can incorporate any material used in fishing rod construction such as bamboo, fiberglass, graphite and the like. Preferably, the flexible rod 12 is constructed from fiberglass or graphite, but most preferably fiberglass. Fiberglass rods 12 are preferred because they are relatively inexpensive, not easily broken, and require little maintenance; however, other users may prefer a graphite rod 12 because graphite rods 12 tend to be light weight but strong. Construction of fiberglass, graphite and other rods 12 may be performed using techniques known to those in the present art.

One skilled in the art will recognize that the fishing rod 10 is not limiting with respect to length, as the length of the flexible rod 12 and thus fishing rod 10 may depend on the type fishing the angler intends to do or the conditions encountered. Long wispy flexible rods 12 may be preferred for long casts in moderate winds. When surf fishing, it may be desirable to have a long fishing rod 10 to cast over or into the surf zone. Thus in some embodiments, the fishing rod 10 is six feet or longer, eight feet or longer, twelve feet or longer and the like. Shorter, sturdier flexible rods 12 may be desired when pulling in heavy game fish from the depths of large lakes or the ocean. Further, in areas where overhanging tree limbs and branches limit the angler's casting area, shorter fishing rods 10 may be desired, such as less than eight feet, six feet or less, five feet or less, four feet or less and the like. The flexible rod 12 may be provided as a single rod or may be detachable into two or more smaller rods, such as for ease of transport. Longer fishing rods 10, such as those over eight feet tend to be detachable, but this is not always the case.

As known in the present art, the flexibility of the flexible rod 12 may be varied depending on the intended fishing, the intended fishing line and the like. A fishing rod 10 intending for larger, heavier fish would tend to be more rigid than a fishing rod 10 for smaller less aggressive fish. Similarly, heavier gauge fishing line such as 25 lb test, 30 lb test 40 lb test and the like, would tend to be more appropriate for a more rigid rod 10; whereas lighter gauge fishing line such as 8 lb test, 10 lb test or 15 lb test and the like would tend to be more appropriate for a less rigid rod 10. The rigidity or flexibility of the flexible rod 12 may be adjusted to alter the overall rigidity of the fishing rod 10. Such methods are known in the present art. Among these include increasing or decreasing the diameter of the flexible rod 12 and increasing or decreasing the amount or density of materials used in construction of the flexible rod 12 and the like. For example, increasing the diameter of a flexible rod 12 would tend to increase its rigidity. Similarly, rigidity may be increased by increasing the amount of fiberglass used when constructing a fiberglass rod 12. Another technique to adjust the rigidity of the flexible rod 12 is adjusting the taper. Fishing rods are rarely uniform in diameter but instead are tapered; the distal region being smaller in diameter than the proximal region. Adjusting the taper adjusts the action of the fishing rod 10. The taper of the flexible rod 12 may be fast, medium, slow or a variation there between. A flexible rod 12 with a fast taper will only flex at about the top 20 percent. Medium fast and medium tapers will flex approximately 30 to 40 percent of the top of the rod 12 respectively. If the rod 12 has a slow taper, almost the entire rod 10 will bend or flex under pressure.

Figure 2E:
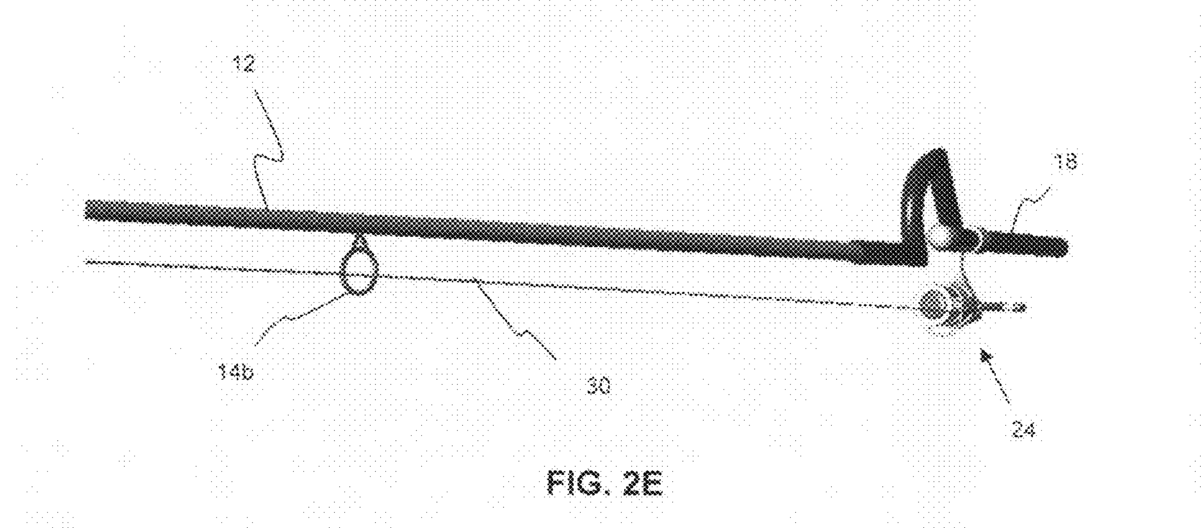
FIG. 2E is a partial view demonstrating the vertical relationship between the primary handle 18 and the flexible rod 12, which can result in decreased contact between the fishing line 30 and the proximal ferrule 14*b*.

Turning to FIGS. 2D and 2E, fishing line 30 can be threaded through the plurality of ferrules 14, which extend downward from the flexible rod 12. The ferrules 14 may incorporate loops, circular rings or support structures as known by those skilled in the present art. As with conventional fishing rods, the number of ferrules 14 may vary depending on the desires of the user and the length of the flexible rod 12. For instance fishing rods 10 intended for surf fishing are frequently longer in length and may therefore have a greater number of ferrules 14 than a shorter fishing rod 10. However, the number of ferrules 14 may also increase as the rigidity of the fishing rod 10 increases. Thus, fishing rods 10 constructed for larger, heavier fish may include a greater number of ferrules 14 than a fishing rod 10 intended for smaller or less aggressive fish. In some embodiments, the plurality of ferrules 14 includes three or more ferrules. In some embodiments, the plurality of ferrules 14 includes at least four ferrules. In some embodiments, the plurality of ferrules 14 includes at least five ferrules.

In conventional fishing rods, the fishing line is in constant or frequent contact with at least two ferrules, including the most proximal ferrule and the most distal ferrule. However, by removing the handle and the rod from conventional alignment, the fishing rod 10 of the present invention favorably positions the reel 24 with respect to the plurality of ferrules 14. In some embodiments of the present invention, the fishing line 30 only contacts the most distal ferrule 14*a* when the line is pulled taught. In some embodiments of the present invention, the fishing line 30 does not contact any of the plurality of ferrules 14 when the line is pulled taught and the flexible rod 12 is not flexed. For example, as demonstrated in FIGS. 2D and 2E, in some embodiments the fishing line 30 does not contact the proximal ferrule 14*b* or intermediate ferrules 14*c, d*. when the rod 12 is not flexed but when the fishing line 30 is taught or stretched. This configuration may increase the performance of the reel 24 or fishing line 30. Further, this configuration may decrease the amount of strain placed on the angler when reeling in the catch, bait or lure.

Figure 4:
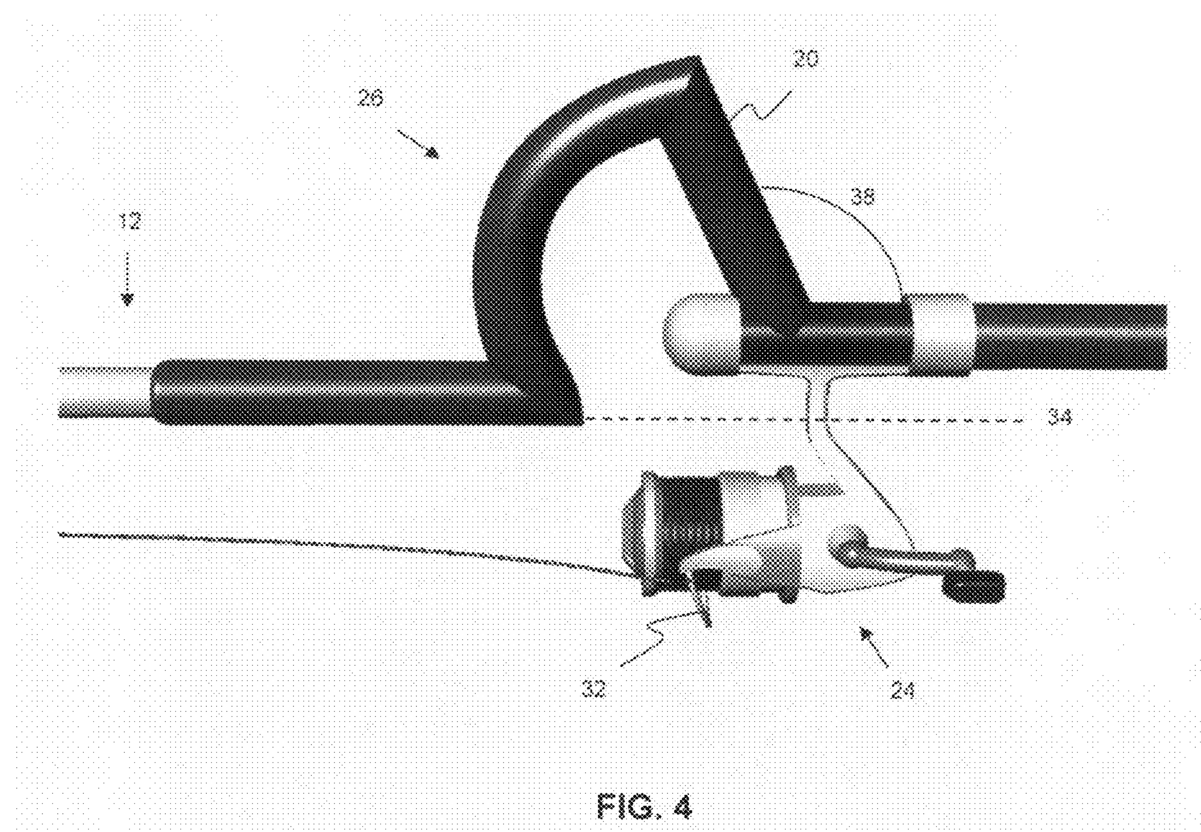
FIG. 4 is a partial side view depicting the preferred configuration of the transition structure 26, the secondary handle 20 and the positioning of primary handle 18 such that the reel 24 and bail 32 maintain sufficient clearance from the lower plane 34 of the rod 12.

The handle 16 includes both a primary handle 18 and a secondary handle 20. The primary handle 18 is positioned at the proximal end of the fishing rod 10 and is typically used when casting and may be used for reeling in fishing line 30, such as once a fish strikes the bait or lure. The primary handle 18 is aligned substantially parallel with the flexible rod 12 and is typically formed from fiberglass, graphite or like and may be wrapped at least in part with a grip. In some embodiments, the primary handle 18 is in linear alignment with the flexible rod 12. However, in the preferred embodiment, the primary handle 18 is positioned vertically above the flexible rod 12. By the term "positioned vertically above" it is meant that the imaginary center line extending longitudinally along the axis of the primary handle 18 is above the imaginary center line extending longitudinally along the axis of the flexible rod 12. If in "linear alignment", the center lines overlap each other. By "substantially parallel" it is meant that the imaginary centerlines do not intersect along the length of the fishing rod 18 when the fishing rod 10 is not flexed or bent but may intersect at a distant point. The vertical distance between the primary handle 18 and the flexible rod 12 may vary depending on the desires of the user, characteristics of the fishing rod 10 or the size of the reel 24. A smaller reel 24 would likely use a fishing rod 10 with a smaller difference in vertical positioning than a larger reel 24. Referring to FIG. 4, in preferred embodiments, the vertical distance is such that the pick up or bail 32 of the intended reel 24 does not extend vertically above the lower plane 34 of the rod 12 when the bail 32 is in the closed or spinning position. In some embodiments, the primary handle 18 is positioned about one centimeter or less above the flexible rod 12. In some embodiments, the primary handle 18 is positioned between one and two centimeters above the flexible rod 12. In some embodiments, the primary handle 18 is positioned between two and three centimeters above the flexible rod 12. In some embodiments, the primary handle 18 is positioned between three and four centimeters above the flexible rod 12. In some embodiments the primary handle 18 is positioned between four and five centimeters above the flexible rod 12. In other embodiments, the primary handle 18 is positioned five or more centimeters above the flexible rod 12. In some instances the positioning may correspond to the intended reel 24.

Figure 3A:
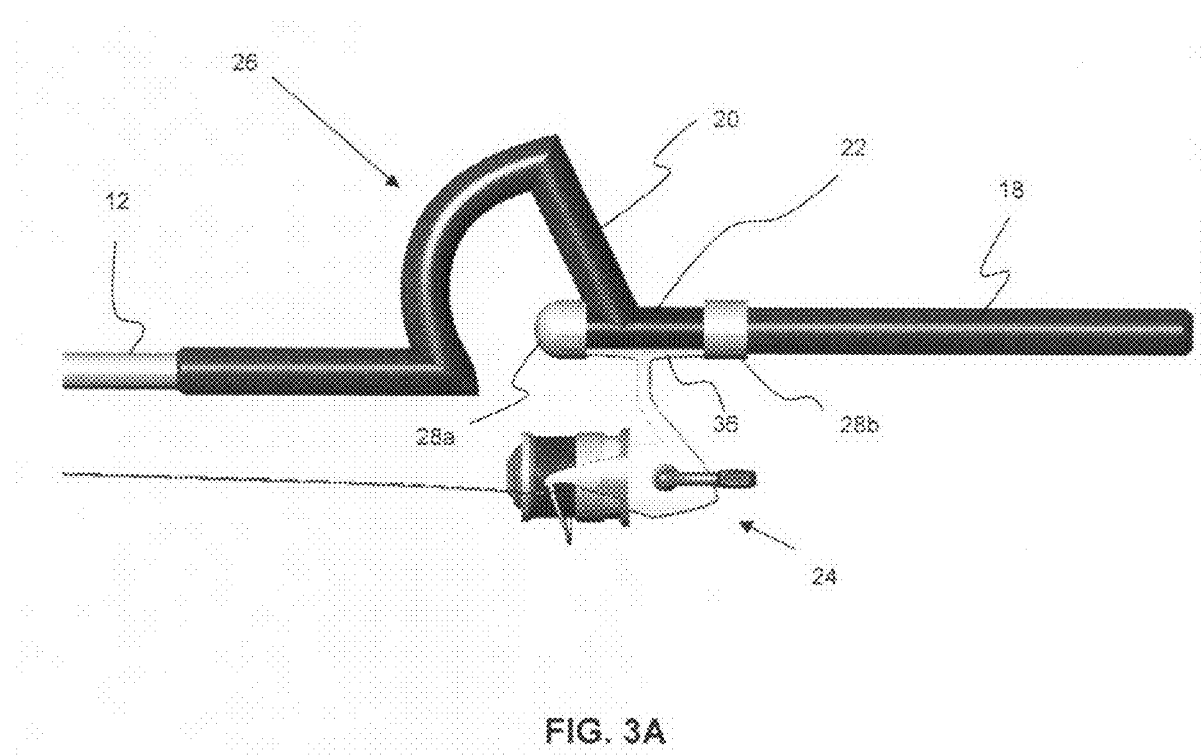
FIG. 3A is a partial side plan view demonstrating a fishing reel 24 mounted underneath the secondary handle 20. Securing the reel 24 may include tightening at least one of the securing nuts 28*a, b* against the reel foot 36.
Figure 3B:
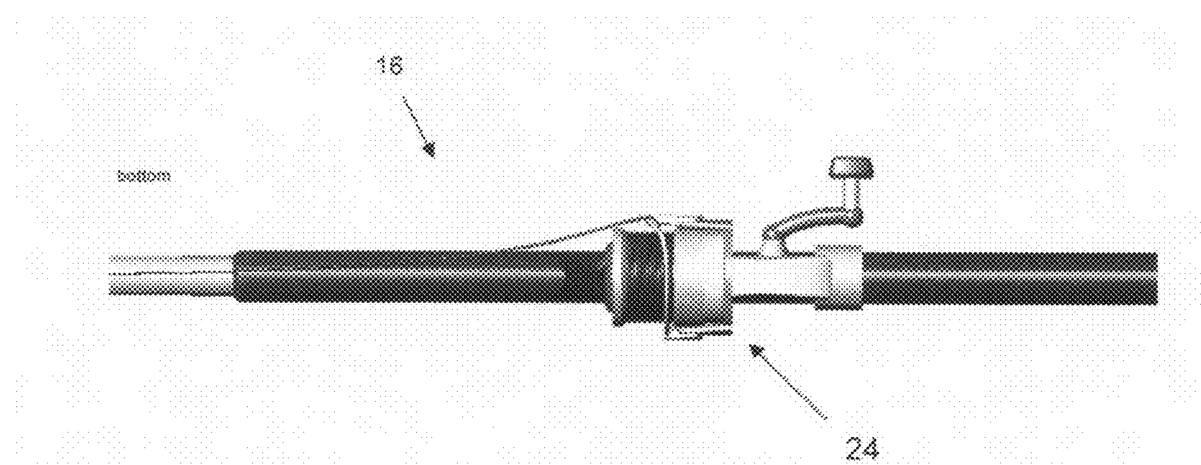
FIG. 3B is a partial bottom plan view depicting the position of the reel 24 underneath the handle 16 and FIG. 3C is a top plan view of FIG. 3B.
Figure 3C:
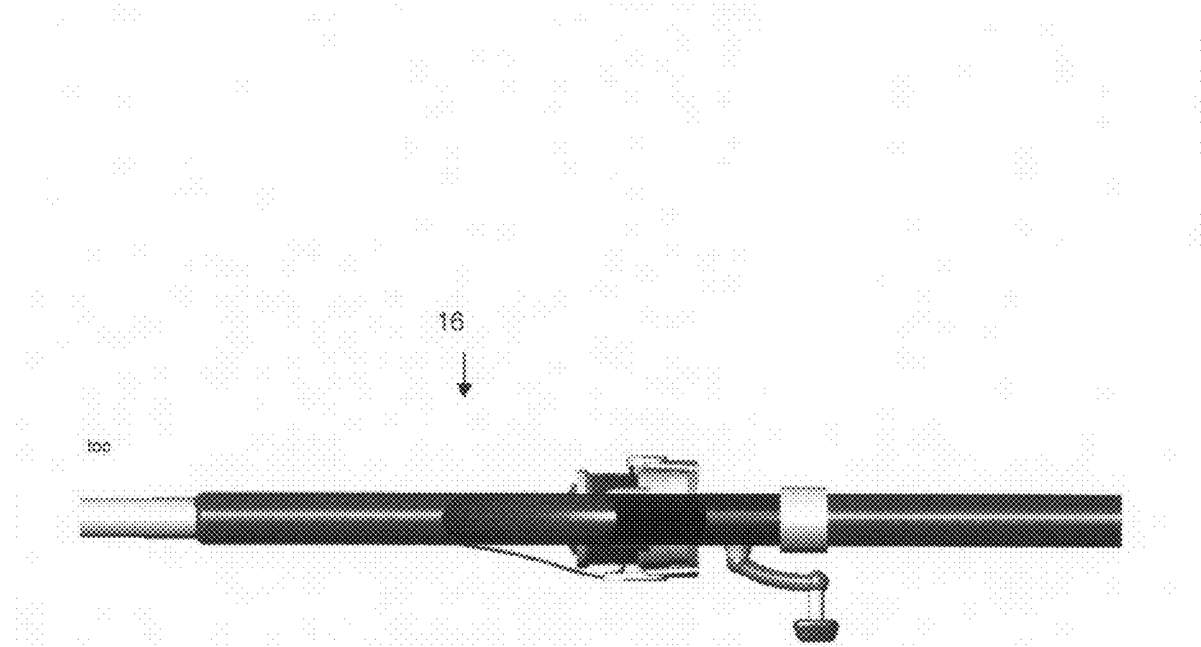

Referring to FIGS. 1 and 3A, the primary handle 18 also includes a reel seat 22 for attachment of a reel 24 to the fishing rod 10. Preferably the fishing rod 10 reversibly attaches to a fishing reel 24, which allows the user to choose from a variety of fishing reels. Commercially available reels include a reel foot 36 for attachment, which allows reels 24 to be interchanged. Typically the reel foot 36 is placed against the reel seat 22 of the fishing rod 10 and secured. Securing the reel 24 may involve rotating at least one of two securing nuts 28*a, b* along a thread formed around the handle 16 or fishing rod 10. The securing nuts 28*a, b* may have recesses for insertion of the reel foot 36 or may be angled such that tightening the securing nuts 28*a, b* wedges the real foot 36 against the real seat 22.

Extending upwards from the primary handle 18 is the secondary handle 20. The secondary handle 20 may be grasped to reduce wrist strain while waiting for a fish to strike and may be used while reeling in a fish. The upward positioning of the secondary handle 20 places the user's wrist in a more comfortable orientation than the conventional bent wrist conformation provided in linear fishing rods. The secondary handle 20 may be constructed from suitable materials such as fiberglass, graphite, thermoplastic and the like and may have a contoured grip for further comfort. The secondary handle 20 may be attached directly above the reel seat 22. Such positioning reduces the horizontal distance between an attached reel 24 and the secondary handle 18, which when grasping the secondary handle 18, reduces corresponding torque forces exerted by gravitational pull on the reel 24. Thus, by positioning the reel 24 substantially in vertical alignment with the secondary handle 18, torque forces are minimized or reduced. The term "substantially in vertical alignment" means at least fifty percent of one component is vertically aligned with another component. For instance viewing FIG. 4, at least fifty percent of the secondary structure 20 is aligned vertically overtop the reel 24. Further, if two components are positioned such that fifty percent of one component is 180 degrees above or below the second component, the two components are substantially in vertical alignment. The secondary handle 18 may extend upwards from the primary handle 18 at any desired angle. Referring to FIG. 4, preferably the outer angle 38 between the primary handle 18 and the secondary handle 20 is greater than 90 degrees but less than 135 degrees. However, any outer angle 38 that is 90 degrees or greater and less than 180 degrees would be well within the scope of the present invention. The length and width of the secondary handle 20 can vary but should be able to be grasped by the intended angler.

As further demonstrated in FIG. 3A, extending from the upper portion of the secondary handle 20 and joining the flexible rod 12 is the transition structure 26. By "upper portion" it is meant that a portion of the uppermost 50 percent of the secondary handle 20 contacts the transition structure 26. Such positioning may provide additional flex to prevent breaking the rod during heavy strikes by fish. Preferably, the transition structure 26 places the flexible rod 12 vertically below the primary handle 18. In the preferred embodiment, the transition structure 26 includes an arced or bent configuration as shown in FIG. 4. The transition structure 26 may be rigid, flexible or may have a spring action. In the preferred embodiment, the transition structure 26 flexes under strain, which reduces forces applied against angler. Thus in some embodiments the flexibility of the fishing rod 10 may involve consideration of the rigidity of the flexible rod 12 and the transition structure 26. In some embodiments, the flexibility of the fishing rod 10 is adjusted by providing a tapered flexible rod 12 and a flexible transition structure 26 that is not tapered. Thus by incorporating a second flexing structure, namely the transition structure 26, the flexing characteristics of the fishing rod may be improved. In preferred embodiments, the flexible rod 12 is more flexible at is most distal end, such as its most distal fifty percent, than the transition structure 26; however, the transition structure 26 is preferably more flexible than the secondary handle 20. Thus the transition structure 26 may in part be useful to prevent breakage of the flexible rod 12 in the case of sudden or large strikes.

Although the fishing rod of the present invention may use a variety of reels 24, the preferred reel 24 for use with the present invention is a spinning reel. Spinning reels are reels that utilize a fixed spool. By fixing the spool in position, spinning reels solve the problem of backlash associated with bait casting reels (those that the spool rotates). Operation of the spinning reel typically involves opening the pick up or bail 32 and holding the line 30 against the fishing rod 10 with the forefinger, and releasing the line 30 while casting. Once the user cranks the handle, the pick up or bail 32 closes and wraps the line around the spool in a coil configuration.

What is claimed is:

1. A fishing rod with ergonomic handle comprising:

a) a flexible rod comprising a plurality of ferrules extending downward;

b) a handle comprising a primary handle substantially parallel to and vertically above said flexible rod and a secondary handle extending upwards from said primary handle, wherein said primary handle comprises a reel seat for downward attachment of a fishing reel; and c) a transition structure joined at one end to said flexible rod and at the opposing end to an upper portion of said secondary handle.

2. The fishing rod with ergonomic handle according to claim 1, wherein the outside angle between said primary handle and said secondary handle is greater than 90 degrees and less than 180 degrees.

3. The fishing rod with ergonomic handle according to claim 1, wherein said secondary handle contacts said primary handle at said reel seat.

4. The fishing rod with ergonomic handle according to claim 1, wherein said transition structure comprises an arc.

5. The fishing rod with ergonomic handle according to claim 1, wherein said secondary handle is positioned in substantial vertical alignment with said reel.

6. The fishing rod with ergonomic handle according to claim 1, further comprising a reel.

7. The fishing rod with ergonomic handle according to claim 6, wherein said reel comprises fishing line extending through said plurality of ferrules, further wherein when said fishing line is taught and said flexible rod is not flexed, said fishing line does not contact more than one of said plurality of ferrules.

* * * * *